S. A. SCOTT.
Seed Planter.
No. 103,666. Patented May 31, 1870.
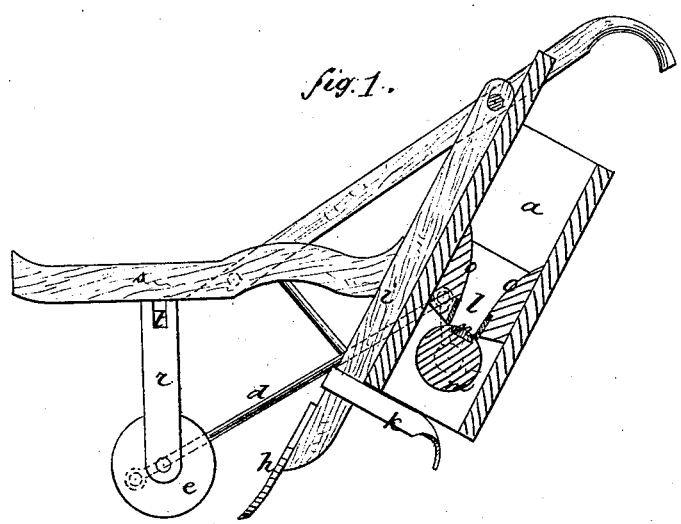
Witnesses:
Inventor:

United States Patent Office.

SAMUEL A. SCOTT, OF GRIFFIN, GEORGIA.

Letters Patent No. 103,666, dated May 31, 1870.

IMPROVEMENT IN SEED-SOWER.

The Schedule referred to in these Letters Patent and making part of the same

*To all whom it may concern:*

Be it known that I, SAMUEL A. SCOTT, of Griffin, in the county of Spaulding and State of Georgia, have invented a new and improved Seed-Sower; and I do hereby declare that the following is a full, clear, and exact description of the same, reference being had to the accompanying drawing forming a part of this specification, in which the figure is a sectional elevation.

This invention consists in the combination of a box for containing seed; a rock-shaft furnished with pockets and working in the lower part of the box; beveled blocks placed in the box above the rock-shaft, in such position as to form a throat converging toward the rock-shaft; a shovel-plow for running furrows in which the seed may drop; hoes for covering the seed after it has fallen into the furrow; a master-wheel on which the plow-beam rests; and a pitman connecting said master-wheel with the rock-shaft, and imparting to the latter its motion.

In the drawing—

$a$ is the seed-box;

$m$, the rock-shaft, placed transversely of the box in its lower part;

$n$, the pockets in the rock-shaft;

$o\ o$, the blocks fastened to the side of the seed-box above the rock-shaft;

$l$, the converging throat, through which kernels pass to the dropping-pockets, by which they are conveyed past the lower ends of the blocks $o$, which approach so near the rock-shaft $m$ as to prevent the seed from passing, except in the pockets;

$e$, the master-wheel;

$d$, the pitman connecting the master-wheel with an arm projecting from the rock-shaft $m$;

$h$, the shovel-plow attached to the lower end of the standard $i$, with the rear side of which the seed-box is connected; and $k$, one of the covering-hoes which extend backward from the standard $i$, one to each side of the seed-slot.

Having thus described my invention,

What I claim as new, and desire to secure by Letters Patent, is—

The combination of the box $a$, rock-shaft $m$, beveled blocks $o$, plow $h$, covering-hoes $k$, master-wheel $e$, and connecting-rod $d$, all constructed and arranged to operate as described.

To the above specification of my invention I have signed my hand this 5th day of April, 1870.

S. A. SCOTT.

Witnesses:
CHAS. A. PETTIT,
SOLON C. KEMON.